(12) United States Patent
Ting et al.

(10) Patent No.: US 8,417,788 B1
(45) Date of Patent: Apr. 9, 2013

(54) FILE SYSTEM FOR VIRTUAL LOCAL AREA NETWORK

(75) Inventors: Dennis P. J. Ting, Groton, MA (US);
Uresh K. Vahalia, Newton, MA (US);
John A. Hilliar, Framingham, MA (US);
Uday Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 3102 days.

(21) Appl. No.: 09/966,709

(22) Filed: Sep. 28, 2001

(51) Int. Cl.
*G06F 15/167* (2006.01)

(52) U.S. Cl.
USPC .......................................... 709/213

(58) Field of Classification Search .......... 709/212–219, 709/221, 228, 202–207, 230–238; 711/148, 711/152; 370/254, 392, 397
See application file for complete search history.

(56) References Cited

U.S. PATENT DOCUMENTS

| | | | |
|---|---|---|---|
| 6,049,528 A | 4/2000 | Hendel et al. | 370/235 |
| 6,338,079 B1 * | 1/2002 | Kanamori et al. | 718/104 |
| 6,339,830 B1 * | 1/2002 | See et al. | 713/202 |
| 6,523,065 B1 * | 2/2003 | Combs et al. | 709/226 |
| 6,622,220 B2 * | 9/2003 | Yoshida et al. | 711/152 |
| 6,636,597 B2 * | 10/2003 | Porter et al. | 379/243 |
| 6,694,369 B1 * | 2/2004 | Vepa et al. | 709/228 |
| 6,895,429 B2 * | 5/2005 | Banga et al. | 709/215 |
| 6,985,956 B2 * | 1/2006 | Luke et al. | 709/229 |
| 7,089,293 B2 * | 8/2006 | Grosner et al. | 709/217 |
| 7,313,614 B2 * | 12/2007 | Considine et al. | 709/223 |
| 7,546,353 B2 * | 6/2009 | Hesselink et al. | 709/216 |
| 7,587,467 B2 * | 9/2009 | Hesselink et al. | 709/214 |
| 7,865,596 B2 * | 1/2011 | Grosner et al. | 709/226 |

OTHER PUBLICATIONS

Beyer-Ebbesen, B. Cowtan, M. Hakimi, S. Love, R. (1997). Migration Issues and Strategies for Token Ring. International Journal of Network Management, 7, 221-239.*

(Continued)

*Primary Examiner* — Sargon Nano
(74) *Attorney, Agent, or Firm* — Hamilton, Brook, Smith & Reynolds, P.C.

(57) ABSTRACT

A file system that utilizes Virtual Local Area Network (VLAN) addressing and routing schemes to permit implementing multiple networked file system applications in a single data processing system. In particular, a networked file server or data mover has associated with it a mass storage device such as one or more disk drives, as well as one or more Network Interface Cards (NICs). A network interface to the data mover is associated with VLAN identifiers (IDs) such that a VLAN ID can be assigned to each file system. At the physical layer of the data mover, VLAN information is encapsulated and passed up to various higher protocol layers, such as a network layer and/or a transport layer, eventually to a selected file system as dictated by the VLAN ID. The file system application in effect becomes an addressable element of the VLAN. A single data mover can thus be deployed to service multiple groups of end users, as long as the members of each group have different VLAN identifiers for the multiple file systems. The result provides security, access restrictions, and all the other benefits of VLAN protocols that would be obtained by deploying separate data movers for each VLAN, without incurring the acquisition expense and administrative overhead associated with having to purchase and maintain multiple data mover systems.

13 Claims, 3 Drawing Sheets

OTHER PUBLICATIONS

Microsoft (2002). Computer Dictionary (5th ed.). Redmond; WA: Microsoft Press.*

VLAN—Webopedia Definition and Links [online], [retrieved on Aug. 18, 2001]. Retrieved from the Internet <http://webopedia.internet.com/TERM/v/VLAN.html>.

White Paper, Virtual LAN Communications [online], [retrieved on Aug. 18, 2001]. Retrieved from the Internet <http://www.cisco.com/warp/public/cc/pd/wr2k/cpbn/tech/vlan_wp.htm>.

* cited by examiner

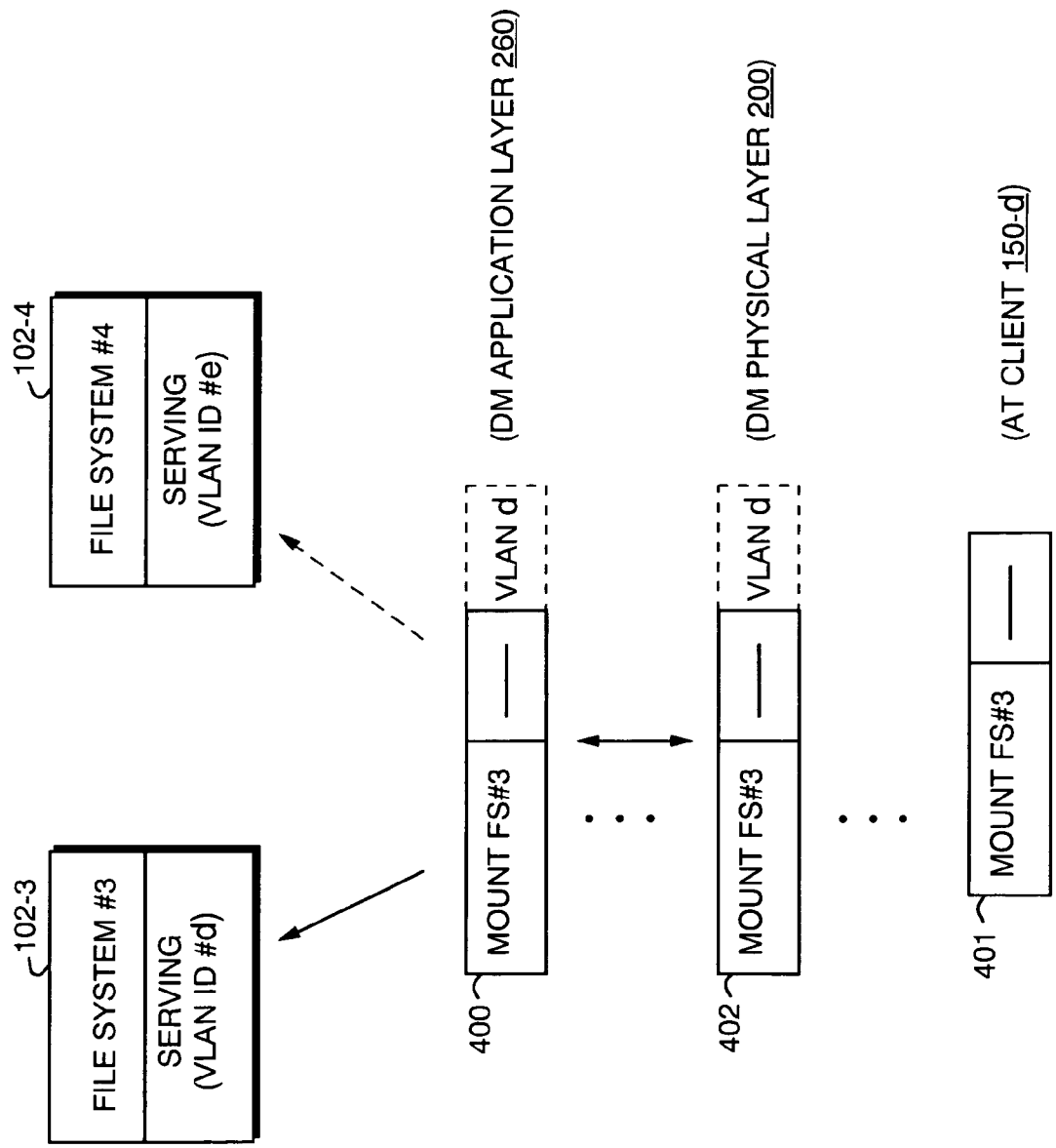

FILE SYSTEM FOR VIRTUAL LOCAL AREA NETWORK

BACKGROUND OF THE INVENTION

Data processing systems are now often used as a primary tool for information storage, protection, management, and access. The advantages of keeping information in digital form are well known. Centrally located data storage resources enable enterprises of all kinds to consolidate their information in one place. By taking advantage of the ubiquitous availability of computer networks, such consolidation allows information to be widely available at many different locations, while also being managed by fewer people more efficiently.

For example, a high performance data processor such as a file server can be designed to efficiently retrieve information from a centralized bank of disks or tape drives. The file server can then be provided with one or more Network Interface Cards (NICs) to provide access to the stored data from client computers connected to a communication network. The specific type of network infrastructure depends upon the needs of the organization, but often it includes network equipment that uses the Institute of Electrical and Electronic Engineers (IEEE) 802.3 Ethernet local area network protocols implemented at the physical layer, as well as higher layer Transmission Control Protocol (TCP), Universal Datagram Protocol (UDP) Internet Protocol (IP), Asynchronous Transfer Method (ATM), and other communication protocols.

In this fashion, the file server may receive requests for access to documents and other files from client computers connected to the communication network. Each such request is typically transmitted in the payload of a TCP or UDP packet which itself includes a Media Access Control (MAC) destination address assigned to one or more network device ports in the file server.

Certain installations aggregate the demands for data storage access among multiple independent users such as Internet Service Providers (ISPs), or in corporate intranets. The relatively large resulting local area network structures can be divided into physical work groups using devices such as Local Area Network (LAN) bridges, to help restrict packet traffic, improve network response time, and also some level of security based upon physical location.

However a logical segmentation of users is also possible, regardless of their physical location, using so called Virtual LAN (VLAN) devices. VLANs offers security, administration, and management of network broadcast activity in much the same way that physically separate LANs would. While VLANs provide logical separation of network traffic, they do not require that work group members to be physically connected to the same switch or hub.

Typical VLAN components include high performance switches that logically segment connected end stations. This allows network managers to group switch ports and the users connected to them into logically defined groups of interest. These groupings can, for example, be co-workers within the same department, a cross-functional product team, or diverse users sharing the same network application or software. By grouping ports and users together across multiple switches, VLANs can span single building infrastructures, interconnected buildings, or even wide area regional networks.

VLANs thus provide the ability for an organization to be physically dispersed throughout a company while maintaining its group identities. For example, accounting personnel might be located in a manufacturing facility, in a research development center, in a field office, as well as in a corporate office. A VLAN provides the necessary security and administration features so that all group members appear to reside on the same virtual network sharing traffic and access rights only with each other.

The network switch is typically a core component of a VLAN, serving as an entry point for traffic originating from end station devices into a switch fabric for communication across an enterprise. The intelligence to group users, ports, or logical addresses into common communities of interest is provided by filtering and forwarding decisions on a packet by packet basis, including packet filtering and packet identification.

The packet identification or so-called "tagging" function assigns the same unique identification (ID) to packets belonging to the same VLAN.

Packet filtering is a technique that examines the particular VLAN ID information before making decision about how to process a packet. For example, a packet VLAN ID is checked when it is either received or forwarded by the VLAN enabled switch. This concept of packet filtering is analogous to those filtering functions commonly implemented in routers.

VLANs may therefore be positioned to solve a number of problems associated with personnel moving, adding, or changing locations within a building or campus. VLANs also provide the benefit of tighter network security by establishing secure and well defined user groups to which traffic is limited, and better management and control of broadcast message activity.

SUMMARY OF THE INVENTION

However, we have realized that VLANs provide only one aspect of an efficient centralized storage solution in an enterprise. For example, the VLAN classification of packets is typically not visible to the data processing equipment application layers themselves, since the VLAN ID information is discarded after packet routing decisions are made at a physical or data link layer. Therefore, file system processing elements must presently be limited to deployment to a unique VLAN group.

The present invention relates to a file system adapted for use with a Virtual Local Area Network (VLAN), such that the file system is aware of and can participate in routing of file system messages to different file system application layer entities based upon VLAN addressing schemes.

In particular, a file server or data mover has associated with it a mass storage device such as one or more disk drives, as well as one or more Network Interface Cards (NICs). A network layer interface to the file system is associated with a VLAN identifier.

VLAN ID information at the physical layer, VLAN information is encapsulated and passed up through various layers, including a data link layer, a network layer, and a transport layer, eventually to the file system layer. This permits the routing of a file system access request itself to one of several file system resources that may be located within the same data storage device.

As a result, the file system application layer itself participates in the VLAN protocol, in effect becoming an addressable element of the VLAN system, while at the same time requiring only a single physical layer network connection. A single data mover to service multiple groups of end users, as long as the members of each group have different VLAN identifiers for the same physical device.

The file system VLAN extensions therefore take advantage of the VLAN protocol itself to identify particular clients' requests, coupling the VLAN identifier information and passing it off to higher protocol layers so that the file system may access it. The result provides security, access restrictions, and all the other benefits of VLAN protocols that would be obtained by deploying separate data movers for each VLAN, without incurring the acquisition expense and administrative overhead associated with having to purchase and maintain multiple data processing systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is an example of how a typical file system command is handled in accordance with the present invention.

DETAILED DESCRIPTION OF THE INVENTION

A description of preferred embodiments of the invention follows.

Figure 1:
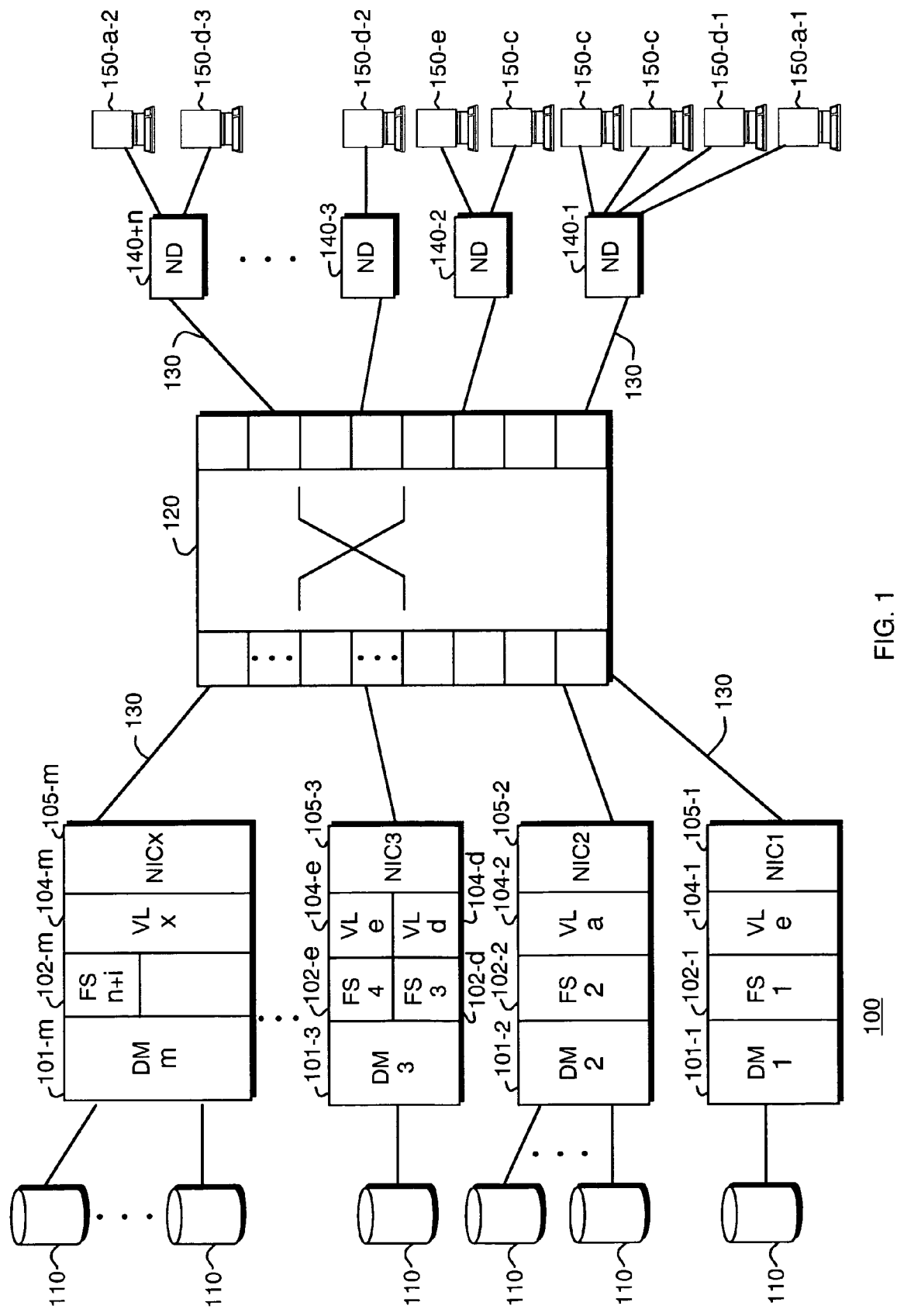
FIG. 1 is a block diagram of a Virtual Local Area Network (VLAN) that has implemented a file system extension according to the present invention.

FIG. 1 is a block diagram of a distributed data processing system for moving data between a storage subsystem 100 and a number of client data processors, such as Personal Computers (PCs) 150. The storage subsystem 100 is connected to the clients 150 via network infrastructure such as physical layer network links 130, network devices (Nds) 140 such as routers, gateways, switches, and various configurations and connections for same, with at least one network device such as a switch 120 having Virtual Local Area Network (VLAN) functionality.

The storage subsystem 100 includes a number of data movers DM1 101-1, DM2 101-2, DM3 101-3, . . . DMm 101-m (collectively, the data movers 101). Each data mover 101 includes a Central Processing Unit (CPU), memory, and peripheral devices interfaces that are not shown in FIG. 1. The primary purpose of the data movers 101 is to act as file servers to provide access to data stored in the data storage peripheral devices 110. The data storage devices 110, which may be accessed through any suitable peripheral interfaces, may include non-volatile storage such as disk drives arranged in cached disk arrays, or tapes arranged in tape silos.

The data movers 101 each have at least one associated Network Interface Card (NIC) 105 that permits the data mover to receive and transmit data to other data processing system devices connected in the distributed computing system. The NICs 105 include at least one network device port. Each such network device port is a assigned a unique media access control (MAC) address, and can independently transmit and receive data over the physical layer communication links 130 through the switch 120 to and from the clients 150.

Each data mover 101 also has at least one file system (FS) 102 associated with it. The file systems 102 are responsible for providing a structure within the operating system (OS) executing on the data mover 101 to translate requests for data file access at an application program level to low level tasks that can be understood by the hardware drivers controlling the storage devices 110.

A file system 102 in accordance with the present invention maintains Virtual Local Area Network (VLAN) identification information associated with file system commands that originated as requests for file access by the clients 150. Each file system 102 thus has associated with it one or more VLAN interfaces 104 that processes packet data received from and maintains VLAN identification information.

One particular data mover 103-3 has associated with it two file systems FS3 102-3 and FS4 102-4, as well as two VLAN Interfaces VLe 104-e and VLd 104-d. The LAN interfaces 104 provide core functionality to implement the present invention. For example, it will be understood shortly that by segregating VLAN Identification (ID) data from messages received at each data mover 101, and allowing the VLAN ID to be passed up through protocol layer stacks to the associated file system 102-3, a single data mover DM3 may be utilized by two or more VLANs while at the same time segregating network traffic to and from the two file systems 102-3 and 102-4 as if they were located in two different data movers 101. This prevents file system accesses from the clients 150 associated with a first VLAN from accessing the file system data associated with clients associated with a different VLAN.

In the typical scenario for an enterprise with a number of clients 150 located in physically diverse locales, there are a number of data movers 101-1, 101-2, 101-3, . . . , 101-m located more or less at a central, secure location. The client computers 150 are arranged in various types of networks including Local Area Networks (LANs) or interconnected via Network Devices (NDs) such as modems, switches, routers and the like, as dictated by the physical location of the clients 150. In the illustrated embodiment there are "n" different client locations which implement a number of LANS. Each of the client LANS is considered to aggregate their network data traffic at an associated networking device 140-1, 140-2, 140-3, . . . , 140-m. The network devices may be routers, switches, bridges, hubs, and the like.

The switch 120 provides multiple ports on both the client side 150 as well as on the data mover 101 side to allow interconnection between them using various network physical links 130. The switch 120 contains and supports Virtual Local Area Network (VLAN) functionality as is known in the art. This function provides the capability, for example, to creating virtual "workgroups" of different clients 150 by logical segmentation of the data traffic among various clients 150 and data movers 101, rather than by physical segmentation.

With the VLAN-enabled switch 120 all of the clients 150-a can be assigned to form a first VLAN (VLa) despite the fact that some of the clients 150-a-1 are physically connected to network device 140-1 while others 150-a-2 are physically connected to different network device 140-n. Data mover 2 (DM2) 101-2 also forms part of VLa, and has its VLAN interface 104-2 programmed with the identifier for VLa. Thus the clients 150-a assigned to VLAN VLa can access the file system at data mover DM2, but not other file systems at data mover 101-1, 101-3, or 101-m. Likewise, attempts by the clients 150-b, 150-c, 150-d, 150-e associated with other VLANS (VLb, VLc, VLd, or VLe) to send traffic to data mover 2 (DM2) will be prevented by the switch 120.

Another VLAN, VLd, has the clients 150-d-1, 150-d-2, 150-d-3 and data mover 3 (DM3) 101-3 as members. Still another VLAN, VLe, is similarly composed of the clients 150-e-1, 150-e-2, 150-e-3 and data mover 3 (DM3) 101-3. Note therefore that DM3 is thus a part of both VLd and VLe. As will be understood shortly, the VLAN communication protocol processing 104-*d* and 104-*e* maintain VLAN identification information for messages processed by DM3 so that file system messages for FS3 104-*d* intended only for the group members of VLd are not broadcast or even made available to the file system FS4 104-*e*, even though FS3 and FS4 are resident at the same physical MAC layer address. Before a file request is processed, its VLAN ID is checked against the VLAN ID assigned to the file system. The request will be rejected if they are different.

The switch 120 and/or network devices 140 (which may also participate in the VLAN protocol) have VLAN packet identification capability to assign a VLAN identifier to each packet associated with the VLAN from which it originated. For example, a certain client 150-*d*-1 may originate a message to the file system 104-*d* associated with data mover DM3. The packets originating from the client 150-*d*-1 are tagged with a VLAN identifier at some point in the networking infrastructure prior to their arrival at the The tagging can be performed by a NIC associated with the client 150 itself, by intervening routers or switches, or may be done by the switch 120 itself. The VLAN ID tagging function is as simple as associating each Media Access Control (MAC) layer device address for a client 150 with a particular VLAN ID, and then tagging packets originating from that MAC address with the associated VLAN ID.

Thus, packets originating from the clients in the VLd group, including clients 150-*d*-1, 150-*d*-2, 150-*d*-3, will be tagged with the same VLAN ID for VLAN VLd, regardless of the fact that they originate with different physical network devices 140-1 and 140-*n*. Similarly, packets originating from client devices 150-*e* are tagged with an VLAN ID for their associated VLe. Packet tagging occurs at some point in the network structure prior to their exit from VLAN switch 120.

The VLAN enabled switch 120 contains packet filtering intelligence to examine traffic originated from the clients 150-1, 150-2, . . . 150-*c*, and make appropriate decisions such as whether or not to route a particular packet to a particular data mover 101. Such decisions may be made by for example, packet filtering and/or packet identification that examines the VLAN ID information in each packet. Devices, schemes and processes well known in the art implement this router-like functionality switch 120, such as by developing a filtering table based upon MAC source addresses.

As a result, packets exiting the switch 120 are only routed to end devices 101 that have a matching VLAN identifier. This provides a first-tier mechanism for allowing only clients 150-*a* to access for example the file system 2 (FS2) associated with data mover 101-2 and its associated VLAN ID for VLAN 2.

However, it is desired with the present invention to support multiple "customers", or more precisely, multiple virtual groups of clients with a single data mover 101. This is done through the expedient of the VLAN extensions VL 104 in the file systems 102 that have been previously eluded to above.

Figure 2:
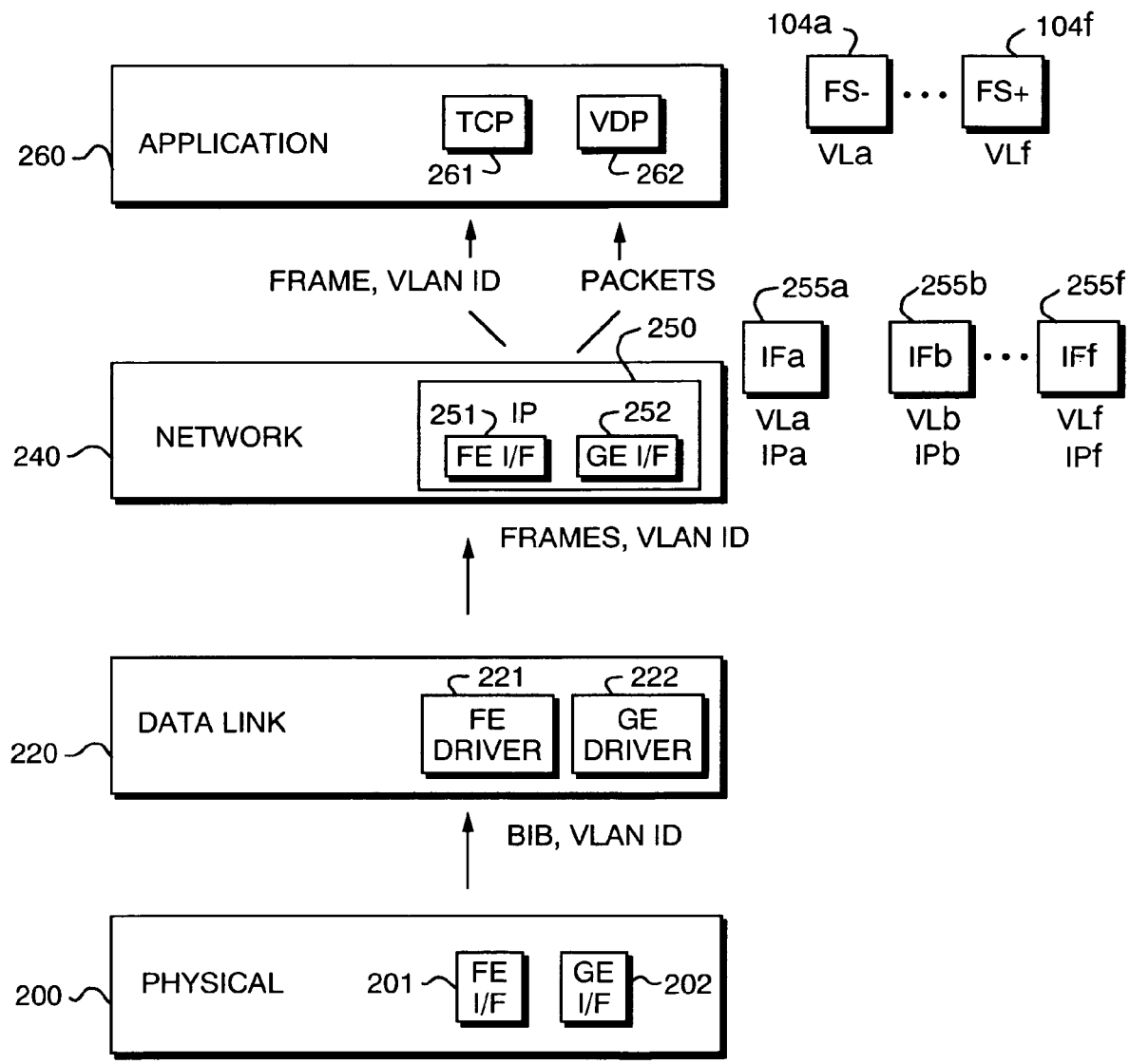
FIG. 2 is a diagram illustrating the interaction of various communication layers in a network interface associated with a data mover.

Now turning to FIG. 2 more particularly, there is shown a block diagram of the network protocol processing as implemented at an exemplary one of the data movers such as data mover 101-3. While the VLAN packet routing infrastructure ensures that packets arrive at an appropriate network interface card (NIC) 104, additional processing must then be performed to ensure that each packet reaches only file system (FS) entities associated with the same VLAN ID.

The protocol processing includes the usual physical layer 200, data link layer 220, network layer 240, and application layer 260 processing and/or equipment. The physical layer 200 is responsible for receiving electrical signals from the communication links 130 and detecting data bits. The physical layer 200 in the preferred embodiment may include either a Fast Ethernet interface 201 or a GigaBit Ethernet (GE) interface 202, or both. It should be understood that other types of networking interfaces at the physical layer may be used.

The physical layer 200 in turn provides a bits stream to the data link layer 220. The data link layer 220 reconstructs the bits into network layer flames or messages. In case of the application of Ethernet technology. The frames will be formatted as ethernet type frames. There is typically an PE data link driver (221) associated with the Fast Ethernet connection, or a GE data link driver (222) if the physical layer 200 is GE.

In the prior art, the associated device driver 221 or 222 in the data link layer 220 could be expected to participate in the VLAN protocol, and filter flames based on their VLAN ID before providing passing them up to the network layer 240. Thus, for example, if a "packet's" VLAN ID matches the stored VLAN information for the particular NIC 105-3, then the VLAN information would be stripped, and the frame will be routed up to the network layer 240. If the VLAN ID information does not match, the frame is discarded at the data link layer 220.

In accordance with the present invention, however, not only is the VLAN information used to make additional routing decisions within the network layer 240 itself, but also the application layer requests remain tagged with the VLAN ID.

More specifically, at the network layer 240 in the preferred embodiment, there are associated a number of interfaces 255*a*, 255*b*, . . . 255*f* having a corresponding VLAN identifier VLa, VLb, . . . VLf, as well as an associated Internet Protocol (IP) address IPa, IPb, . . . , IPf. Each frames received at the network layer 240 is examined for its associated VLAN ID, and then routed to the appropriate interface 255 based on the VLAN identifiers VLa, VLb, . . . VLf associated with each interface 255.

In this manner, an interface 255 can be thus associated with each file system 104 to be supported in this particular data mover 101. For example, in the case of data mover DM 3 101-3, there is an interface 255*d* to which the frames having VLd are sent; and an interface 255*e* to which the frames having VLe are sent.

The IP formatted frames are then passed from the network layer 240 up to the application layer 260. It may or may not be necessary to further pass VLAN ID information from the network layer 240 to the application layer 260. This depends upon whether a Transmission Control Protocol (TCP) or Universal Datagram Protocol (UDP) is in use.

At this application layer 260, there is a first file system 104-*d* associated with serving the users of VLd and a second file system 104-*e* associated with and used only by the clients 150-*e* associated with VLe.

Handling of frames at this point depends in part upon the higher layer communication protocol in use. In the case of UDP, the file system messages will be in the form of a complete IP packet. Thus, the UDP protocol stack 262 in the application layer 260 receives complete IP packets, and can pass the complete IP packet directly to the appropriate file system 104-*a*, . . . , 104-*f* by examining the associated IP address in the packet. However, in the case of TCP, a frame is not guaranteed to contain a complete IP packet (e.g., a packet may encompass more than one network layer frame). A TCP frame can contain one file system request, more than one request, or an incomplete request because TCP frame boundaries do not necessarily match application layer message boundaries. Thus, a TCP protocol stack 261 in the application layer 260 should also have the VLAN ID passed up to it, to assist in routing partial requests to the appropriate file system 104.

The assembled packets are fed to application software in the associated file system. FIG. 3 illustrates one example of how a file system access request is processed by the various elements of the VLAN file system according to the invention. At the client 150-*d*-1 in VLAN d, the file system request originates as, for example, a storage volume mount command 401 formatted as

MOUNT FS3

This indicates that the client 150-*d*-1 wishes a particular volume as identified by FS3 to be mounted by the data mover DM3. TCP/IP and Ethernet layer headers (not shown) are added to the command 401 so that it may be forwarded as a network message from the client 150 through the network devices 140 and switch 120 arriving at a physical layer at the data mover 101-3.

At some point in its travel before exiting at the switch 120, the message 402 has the format MOUNT FS3|VLAN ID d it now having been tagged with the VLAN identifier for the originator of the message. The message then arrives at the data mover 101-3 physical layer, such as may be implemented by the NIC 105-3.

The VLAN identifier is then passed up through the protocol layers at the data mover 101 via the VLAN extensions VLd 104-*d* and interfaces 255*d* until it reaches the application layer 260. At this point, the application layer 260 can route the file system command to the appropriate application. As explained above, this is done by examining the VLAN ID.

Eventually, the command 400 will return to its original form

MOUNT FS3

'having been stripped of its VLAN ID and having arrived at the appropriate file system FS3 102-3, and not having been routed to the other file system FS4 102-4 associated with the same data mover 101-3.

It can now be understood how virtual LAN extensions can be added to data processing elements associated with a file system to permit multiple defined groups of end users to share the same data mover equipment, while at the same time restricting message traffic only to file systems associated with each group.

It should be understood that certain client commands may need to be modified in their execution to correctly reflect the implications of the VLAN extensions to the file system. A user command such as SHOWMOUNT is executed at the file system layer in the data mover, and is expected to reply with a list of all clients with file systems mounted on a specified device.

In this case, the SHOWMOUNT command should be modified to return only a list of clients that have the same VLAN ID as the client that issued the SHOWMOUNT command. Thus, when a SHOWMOUNT is issued by a client 150-*d*-2 to determine the identity of other clients having issued MOUNT commands to file system FS3 104-*d*, only information concerning other clients 150-*d* on VLd should be returned. It should not return any information concerning the clients 150-*e* that have issued MOUNTs to file system FS4, even though these two file systems FS3 and FS4 share the same data link (MAC) layer address.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
assigning logical identifiers to at least two groups of clients;
assigning, to each of at least two of multiple file systems resident in a single file server, the same logical identifiers assigned to the two groups of clients, access to a given file system being restricted to client data processors that are members of specified groups, each file system being assigned a different logical identifier than the other file systems resident in the single file server, so that each group of clients is associated with a respective one of the file systems;
originating a file system request message at one of the clients;
tagging the file system request with the logical identifier of the group to which the client belongs;
routing the file system request message through a data network, including at least one step of examining the logical identifier in connection with making a message routing decision so that the message is only routed to a file server having the file system associated with the logical identifier;
receiving the file system request at the file server;
within a designated protocol layer at the file server higher than a data link layer, passing the logical identifier information to the next higher layer; and
at a selected protocol layer which is responsible for passing messages to the file systems in the single file server,
examining the logical identifier information to select a file system as a selected file system to which the message is to be routed, the selected file system effectively an addressable element of the data network thereby requiring only a single physical network connection, so that only messages intended for the selected file system associated with the logical identifier are routed to the selected file system, and other messages with different logical identifiers are not routed to that selected file system;
wherein a communication protocol in use is Transmission Control Protocol (TCP), the selected protocol layer is the transport layer, and the logical identifier is passed up to the transport layer with a data payload provided by a network layer.

2. A method as in claim 1 wherein the logical identifiers are Virtual Local Area Network (VLAN) identifiers.

3. A method as in claim 1 wherein the file systems have an interface associated with each logical identifier.

4. A method as in claim 3 wherein the file system interfaces have an associated Internet Protocol (IP) layer address.

5. A method as in claim 1 wherein file system commands intended to return client information return only information concerning clients having the same logical identifier as the requesting client.

6. An apparatus comprising:
a virtual local area network device for assigning logical identifiers to message traffic originating from at least two groups of clients such that the logical identifier assigned to traffic originating from a first group of clients is different from a logical identifier assigned to traffic originating from a second group of clients; and
a message processor associated with a single file server having multiple file systems resident therein, access to a given file system being restricted to client data processors that are members of specified groups, for examining logical identifiers associated with received messages and routing such messages only to the respective file system having a logical identifier that is the same as the logical identifier of a client computer that originated the file system request, the processor further having multiple protocol layers to process received file system request messages of a designated protocol layer in the file server higher than a data link layer, and for passing the logical identifier information to a next higher layer such that the file system examines the logical identifier information to select a file system to which a message is to be routed, the selected file system effectively an addressable element of a data network thereby requiring only a single physical network connection, so that only messages intended for a selected file system associated with a logical identifier are routed to the selected file system and other messages with different logical identifiers are not routed to that selected file system;

wherein a communication protocol in use is transmission controlled protocol (TCP), the selected protocol layer is the transport layer, and the logical identifier is passed up to the transport layer with a data payload provided by a network layer.

7. An apparatus as in claim 6 wherein the logical identifiers are virtual local area network (VLAN) identifiers.

8. An apparatus as in claim 6 wherein the file systems have an interface associated with each logical identifier.

9. An apparatus as in claim 8 wherein the file system interfaces have an associated Internet Protocol (IP) layer address.

10. An apparatus as in claim 6 wherein file system commands intended to return client information return only information concerning clients having the same logical identifier as the requesting client.

11. A method for controlling access to one of several file systems resident in a given file server, comprising:
    originating a file system request at a client data processor;
    tagging the file system request with a Virtual Local Area Network (VLAN) identifier;
    routing the file system request through a data network from the client data processor to a file server, the file system request arriving at an application layer in the file server with the VLAN identifier associated with the file system request still intact;
    examining the VLAN identifier to determine how the file system request is to be routed to a particular one of several file systems resident in the same file server, the particular file system effectively an addressable element of the data network thereby requiring only a single physical network connection;
    within a designated protocol layer at the file server higher than a data link layer, passing the VLAN identifier information to the next higher layer;
    wherein a communication protocol used to route the file system request is Transmission Control Protocol (TCP), the VLAN identifier is examined at the transport layer, and the VLAN identifier is passed up to a transport layer with a data payload provided by a network layer.

12. A method as in claim 11 wherein the file systems have an interface associated with each VLAN identifier.

13. A method as in claim 12 wherein the file system interfaces each have an associated Internet Protocol (IP) layer address.

* * * * *